United States Patent
Lavertu et al.

(10) Patent No.: US 10,094,324 B2
(45) Date of Patent: Oct. 9, 2018

(54) SYSTEM AND METHOD OF OPERATING AN INTERNAL COMBUSTION ENGINE

(71) Applicant: General Electric Company, Schenectady, NY (US)

(72) Inventors: Thomas Michael Lavertu, Clifton Park, NY (US); Adam Edgar Klingbeil, Ballston Lake, NY (US); Roy James Primus, Niskayuna, NY (US); Omowoleola Chukwuemeka Akinyemi, Clifton Park, NY (US); Venu Gopal Gummadavelli, Fairview, PA (US); Barry Allen Record, Grove City, PA (US); James Henry Yager, Northville, MI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1067 days.

(21) Appl. No.: 13/905,691

(22) Filed: May 30, 2013

(65) Prior Publication Data

US 2014/0358404 A1 Dec. 4, 2014

(51) Int. Cl.
*F02B 3/00* (2006.01)
*F02D 43/04* (2006.01)
(Continued)

(52) U.S. Cl.
CPC ............ *F02D 43/04* (2013.01); *F02B 37/004* (2013.01); *F02B 37/013* (2013.01); *F02B 37/16* (2013.01);
(Continued)

(58) Field of Classification Search
CPC ........ F02B 3/06; F02B 37/013; Y02T 10/144; Y02T 10/44; F02D 2250/36;
(Continued)

(56) References Cited

U.S. PATENT DOCUMENTS 4,232,641 A * 11/1980 Curtil .............................. 123/76
4,397,285 A * 8/1983 O'Neill ......................... 123/502
(Continued)

FOREIGN PATENT DOCUMENTS

CN 101208505 A 6/2008
FR 2940357 A1 6/2010
(Continued)

OTHER PUBLICATIONS

By: John B. Heywood, "Internal Combustion Engine Fundamentals", 1988, McGraw-Hill, pp. 51-53; 249; 296 and 839.*
(Continued)

*Primary Examiner* — Hai Huynh
*Assistant Examiner* — Gonzalo Laguarda
(74) *Attorney, Agent, or Firm* — John P. Darling

(57) ABSTRACT

A method of operating an internal combustion engine is provided. The method includes combusting a mixture of fresh air and fuel within multiple cylinders. The method also includes directing a first portion of exhaust gases into a first-stage turbine and a second-stage turbine of a turbocharger for expanding the exhaust gases, directing a second portion of exhaust gases from the exhaust manifold via an exhaust channel bypassing the first-stage turbine and recirculating a third portion of exhaust gases into an intake manifold after mixing with fresh air. The method includes controlling at least one of: reducing a normal engine speed at each engine power setting while maintaining constant engine power level by increasing a fuel injection per cycle; concurrently increasing a flow rate of the third portion of exhaust gas during recirculation; and advancing a fuel injection timing for reducing emission levels that meets Tier 4 requirements.

19 Claims, 4 Drawing Sheets

(51) Int. Cl.
*F02D 41/00* (2006.01)
*F02B 37/00* (2006.01)
*F02B 37/013* (2006.01)
*F02B 37/16* (2006.01)
*F02B 37/18* (2006.01)
*F02B 37/22* (2006.01)
*F02M 26/08* (2016.01)
*F02M 26/10* (2016.01)
*F02D 41/14* (2006.01)
*F02D 41/40* (2006.01)
*F02D 31/00* (2006.01)
*F02B 29/04* (2006.01)
*F02M 26/23* (2016.01)

(52) U.S. Cl.
CPC .............. *F02B 37/18* (2013.01); *F02B 37/22* (2013.01); *F02D 41/005* (2013.01); *F02D 41/0007* (2013.01); *F02D 41/1461* (2013.01); *F02D 41/401* (2013.01); *F02M 26/08* (2016.02); *F02M 26/10* (2016.02); *F01N 2560/026* (2013.01); *F02B 29/0412* (2013.01); *F02D 31/001* (2013.01); *F02D 41/144* (2013.01); *F02D 41/1454* (2013.01); *F02D 41/40* (2013.01); *F02D 2041/001* (2013.01); *F02D 2250/18* (2013.01); *F02D 2250/36* (2013.01); *F02D 2250/38* (2013.01); *F02M 26/23* (2016.02); *Y02T 10/142* (2013.01); *Y02T 10/144* (2013.01); *Y02T 10/44* (2013.01); *Y02T 10/47* (2013.01)

(58) Field of Classification Search
CPC ............... F02D 41/401; F02D 2250/18; F02D 41/1454; F02D 41/40; F02D 41/1446; F02D 41/0047; F02D 41/0072; F02M 26/02
USPC ......... 701/103–105, 108, 110; 123/672, 436, 123/679, 703, 704, 568.21; 60/605.2, 60/274, 285, 286
See application file for complete search history.

(56) References Cited

U.S. PATENT DOCUMENTS

| | | | |
|---|---|---|---|
| 5,947,083 A * | 9/1999 | Ishida | 123/339.11 |
| 6,651,432 B1 | 11/2003 | Gray, Jr. | |
| 8,091,536 B2 | 1/2012 | Munshi et al. | |
| 8,136,505 B2 | 3/2012 | Ruhlan et al. | |
| 8,720,422 B2 | 5/2014 | Potteau et al. | |
| 9,267,430 B2 * | 2/2016 | McNulty | F02B 47/08 |
| 2004/0061290 A1 | 4/2004 | Gray | |
| 2004/0099248 A1 | 5/2004 | Ito et al. | |
| 2004/0112329 A1 * | 6/2004 | Coleman et al. | 123/305 |
| 2004/0134193 A1 | 7/2004 | Klingel | |
| 2004/0237930 A1 * | 12/2004 | Kawamura et al. | 123/299 |
| 2005/0022506 A1 | 2/2005 | Nishizawa et al. | |
| 2007/0062179 A1 | 3/2007 | Leone | |
| 2007/0250251 A1 | 10/2007 | Green et al. | |
| 2008/0047509 A1 | 2/2008 | Sellnau et al. | |
| 2008/0103676 A1 | 5/2008 | Ancimer et al. | |
| 2010/0097979 A1 | 4/2010 | Shinozaki | |
| 2010/0300089 A1 * | 12/2010 | Gibble et al. | 60/602 |
| 2011/0253103 A1 * | 10/2011 | Talwar et al. | 123/445 |
| 2011/0296828 A1 * | 12/2011 | An et al. | 60/600 |

FOREIGN PATENT DOCUMENTS

| | | |
|---|---|---|
| WO | 0186125 A1 | 11/2001 |
| WO | 2010021190 A1 | 2/2010 |
| WO | 2012030356 A2 | 3/2012 |

OTHER PUBLICATIONS

Aken et al., "Appliance of High EGR Rates With a Short and Long Route EGR System on a Heavy Duty Diesel Engine", SAE International, 2007-01-0906, Apr. 16, 2007, 8 Pages.

"Innovative MAN Diesel Engines for Mobile Machinery", MAN Engines, A division of MAN Truck & Bus, Mar. 2008, Downloaded from the internet<http://www.man-engines.com/en/press_media/Pressreleases_99499.html> on Feb. 7, 2013, 4 Pages.

"Komatsu Interim Tier 4 Engine Technology", Komatsu America Corp.—Tier 4, 2012, Downloaded from the internet: <http://www.komatsuamerica.com/tier4.asp> on Feb. 26, 2013, 3 Pages.

Eurasian search report issued in connection with corresponding EA Application No. 201490844 on Jan. 20, 2015.

European Search Report issued in connection with corresponding EP Application No. 141704981 dated Jul. 20, 2015.

EPA Tier 4 locomotive emissions regulation (40 CFR Part 1033), dated Jul. 1, 2011, "retrieved from http://www.gpo.gov/fdsys/granule/CFR-2011-title40-vol33/CFR-2011-title40-vol33-part1033" on Aug. 13, 2015.

Unofficial English translation of Office Action issued in connection with corresponding CN Application No. 201410237164.6 dated Apr. 5, 2016.

\* cited by examiner

SYSTEM AND METHOD OF OPERATING AN INTERNAL COMBUSTION ENGINE

BACKGROUND

The embodiments of the present invention relate generally to a system and method of operating an engine and, more specifically, to a system and method for controlling exhaust emissions of an engine.

Compression-ignition engines, such as diesel engines, operate by directly injecting a fuel (e.g., diesel fuel) into compressed air in one or more piston-cylinder assemblies, such that the heat of the compressed air ignites the fuel-air mixture. Compression-ignition engines may also include a glow plug to provide heat to ensure ignition. The direct fuel injection atomizes the fuel into droplets, which evaporate and mix with the compressed air in the combustion chambers of the piston-cylinder assemblies. Typically, compression-ignition engines operate at a relatively higher compression ratio than spark ignition engines. The compression ratio directly affects the engine performance, efficiency, exhaust pollutants, and other engine characteristics. In addition, the fuel-air ratio affects engine performance, efficiency, exhaust pollutants, and other engine characteristics. Exhaust emissions generally include pollutants such as carbon oxides (e.g., carbon monoxide), nitrogen oxides ($NO_x$), sulfur oxides ($SO_x$), particulate matter (PM), and unburned hydrocarbons (HC). The amount and relative proportion of these pollutants varies according to the fuel-air mixture, compression ratio, injection timing, environmental conditions (e.g., atmospheric pressure, temperature, etc.), and the like. New stringent emission requirements like United States Environmental Protection Agency (EPA) Tier 4 locomotive (40 CFR Part 1033) emissions regulations drive the need of engine design methods that uses aftertreatment systems for controlling the exhaust emissions. However, the use of aftertreatment systems may increase the cost of manufacturing the engines and fuel consumption leading to high life cycle cost.

There is therefore a desire for a system and method for an enhanced technique for controlling exhaust emissions and achieving low specific fuel consumption of an engine.

BRIEF DESCRIPTION

In accordance with an embodiment of the invention, a method of operating an internal combustion engine is provided. The method includes combusting a mixture of a flow of fresh air and a fuel within a plurality of cylinders, wherein the fuel is injected from a fuel injection system into the plurality of cylinders. The method also includes directing a first portion of exhaust gases from an exhaust manifold into a first-stage turbine and a second-stage turbine of a turbocharger for expanding the first portion of the exhaust gases. The method further includes directing a second portion of exhaust gases from the exhaust manifold via an exhaust channel bypassing the first-stage turbine. Furthermore, the method includes recirculating a third portion of exhaust gases from the exhaust manifold into an intake manifold after mixing with the flow of fresh air. The method includes controlling at least one of: reducing a normal engine speed at each engine power setting while maintaining constant engine power level by increasing a fuel injection per cycle for increasing torque; concurrently increasing a flow rate of the third portion of exhaust gas during recirculation; and advancing a fuel injection timing for reducing nitrogen oxide (NOx) and particulate matter (PM) emission levels that meets the regulated requirements.

In accordance with an embodiment of the invention, a system of combusting fuel is provided. The system includes an internal combustion engine comprising a plurality of cylinders of the engine for combusting a mixture of fresh air and fuel. The system further includes a turbocharger including a turbine coupled via a turbocharger shaft to a compressor, wherein the compressor is configured to receive the fresh air and discharge a compressed air stream to an intake manifold of the internal combustion engine. Furthermore, the system includes a first flow path for allowing a first portion of exhaust gases from an exhaust manifold into the turbine for expanding the first portion of the exhaust gases, a second flow path for allowing a second portion of exhaust gases from the exhaust manifold via an exhaust channel bypassing a first-stage turbine and a third flow path for recirculating a third portion of exhaust gases from the exhaust manifold into the intake manifold after mixing with the fresh air. The system also includes a controller comprising multiple sensors for sensing multiple operating parameters, wherein the controller is configured to reduce a normal engine speed at each engine power setting while maintaining constant engine power level by increasing a fuel injection per cycle for increasing torque, increase a flow rate of the exhaust gas recirculation, increase injection pressure, lower a compression ratio and advance a fuel injection timing for reducing nitrogen oxide (NOx) and particulate matter (PM) emission levels that meets emissions regulations.

In accordance with an embodiment of the invention, a controller is provided. The controller includes multiple sensors for sensing multiple operating parameters. The controller also includes a control unit configured for varying and optimizing a speed of operation of the engine at each engine power setting, an exhaust gas recirculation, a fuel injection pressure and/or duration and a fuel injection timing for reducing nitrogen oxide (NOx) and particulate matter (PM) emission levels that meets emissions regulation. The optimizing of speed of operation of the engine at each engine power setting includes concurrently reducing a normal engine speed at the corresponding engine power setting while maintaining constant engine power level by increasing a fuel injection per cycle for increasing torque, increasing the exhaust gas recirculation and advancing the fuel injection timing in response to both the nitrogen oxide (NOx) and particulate matter (PM) emission levels of the exhaust gases of the engine.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
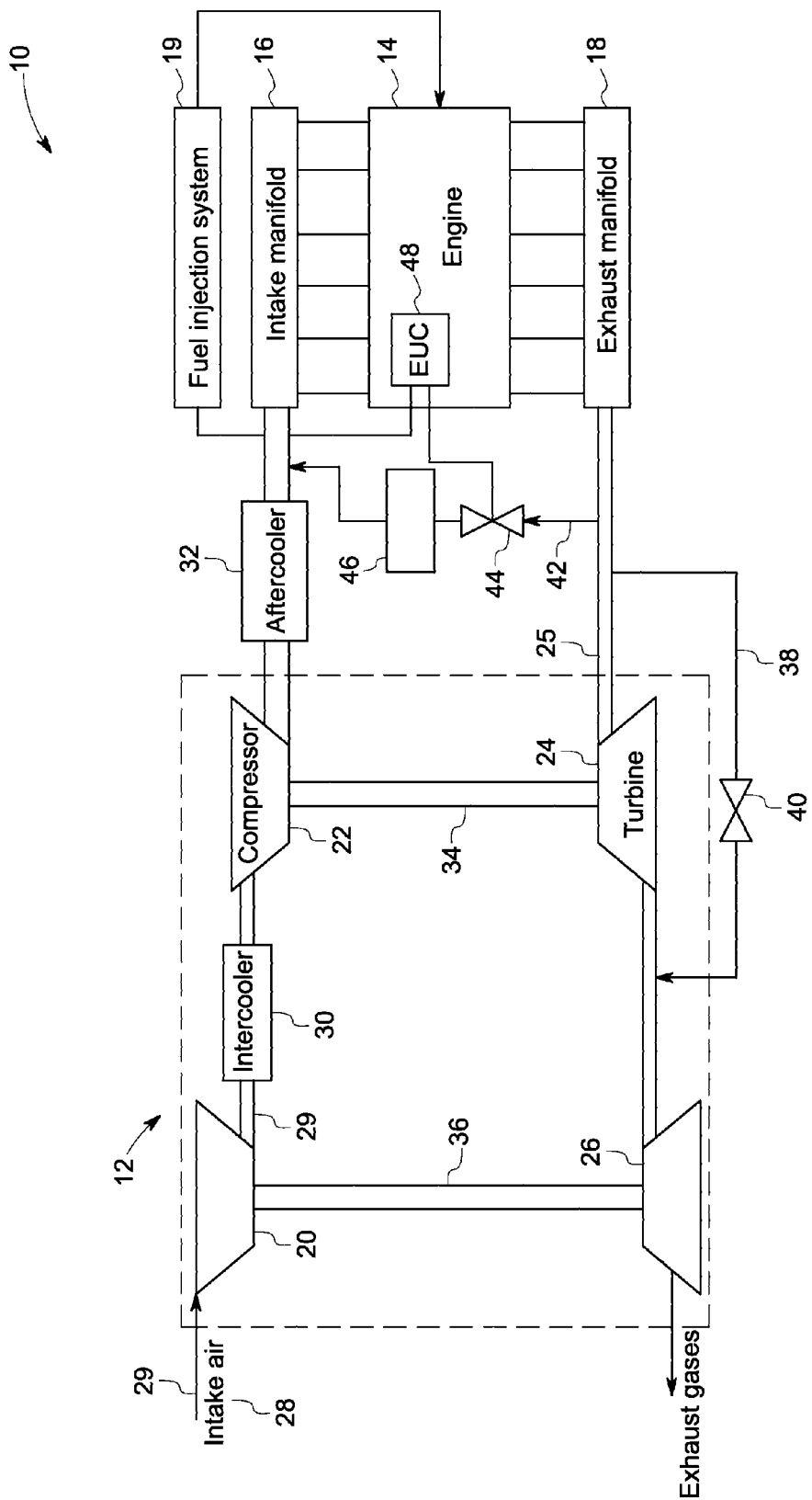
FIG. 1 is a schematic view of a system having a turbocharger system in accordance with an embodiment of the present invention.

FIG. 1 is a schematic view of a system 10 having a turbocharger unit 12 in accordance with an embodiment of the present invention. The turbocharged unit 12 includes a two staged turbocharger and a compression-ignition engine, e.g., a diesel engine 14. In one embodiment, the system 10 may include a single staged turbocharger. The engine 14 includes a plurality of combustion cylinders. A piston (not shown) is slidably disposed in each cylinder and reciprocates between a top dead center and a bottom dead center position. It should be noted herein that the number of cylinders may vary depending upon the application. The illustrated engine 14 includes an air intake manifold 16 and an exhaust manifold 18. The combustion cylinders are coupled to the intake manifold 16 and receive compressed air via the intake manifold 16. A motor-generator unit (not shown) may be mechanically coupled to the turbocharger unit 12. The system 10 further includes a fuel injection system 19 for injecting fuel into the multiple cylinders of the engine 14. The fuel injection system 19 includes a fuel injector pump (not shown) for driving multiple fuel injectors (not shown) for injecting the fuel into the multiple cylinders of the engine 14.

The turbocharger unit 12 includes a first-stage compressor 20, a second-stage compressor 22, a first-stage turbine 24, and a second-stage turbine 26. Intake fresh air 28 may be drawn through a filter (not shown) into an intake channel 29 and then compressed to a higher pressure via the first-stage compressor 20. The temperature of air is increased due to compression. The compressed intake air 28 is cooled via an intercooler 30, and then further compressed to a further higher pressure via the second-stage compressor 22. The compressed air 28 is then cooled via an aftercooler 32 and then supplied to the intake manifold 16 for combustion within the engine 14. The compressed air 28 flows through the aftercooler 32 such that the temperature of air is reduced prior to delivery into the intake manifold 16 of the engine 14. In one embodiment, the intercooler 30 and the aftercooler 32 may be air-to-water heat exchangers, which utilize a coolant to facilitate removal of heat from the compressed air. In another embodiment, the intercooler 30 and the aftercooler 32 may be air-to-air heat exchangers, which utilize ambient air to facilitate removal of heat from compressed air. In yet another embodiment, the intercooler 30 and the aftercooler 32 may be a hybrid cooler arrangement that utilizes both air-to-water and air-to-air heat exchangers.

The first-stage turbine 24 is coupled to the exhaust manifold 18 for extracting energy from exhaust gases for rotating a turbocharger shaft 34 coupled to the second-stage compressor 22. The second-stage turbine 26 is coupled to the first-stage turbine 24 for extracting energy from expanded gases fed from the first stage turbine 24, for rotating a turbocharger shaft 36 coupled to the first-stage compressor 20. The expanded gases from the second-stage turbine 26 may be ejected to the atmosphere.

In the illustrated embodiment, an exhaust channel 38 is disposed bypassing the first-stage turbine 24. A bypass control valve 40 is provided to the exhaust channel 38 to control flow through the exhaust channel 38. In some embodiments, all of the exhaust gas from the exhaust manifold 18 is expanded through the first-stage turbine 24. In the embodiment as shown in FIG. 1, a first portion of the exhaust gas flows in a first flow path 25 from the exhaust manifold 18 into the first-stage turbine 24 for expanding and a second portion of the exhaust gas from the exhaust manifold 18 is fed through the exhaust channel 38 bypassing the first-stage turbine 24. The second portion of the exhaust gas fed through the channel 38 is expanded via the second-stage turbine 26.

The system 10 also includes a third flow path 42 for recirculating a third portion of exhaust gases from the exhaust manifold 18 into the intake manifold 16 after mixing with the compressed air 28. An exhaust gas recirculation (EGR) control valve 44 is provided to control flow of the compressed air 28 through the third flow path 42. In some embodiments, the entire exhaust gas from the donor cylinders (not shown) is fed via the third flow path 42 into the intake manifold 16. An EGR cooler 46 is provided to the third flow path 42 for cooling the exhaust gas prior to feeding into the plurality of combustion cylinders via the intake manifold 16. In one embodiment as shown in FIG. 1, the third portion of exhaust gases flowing in the third flow path 42 from the exhaust manifold 18 is recirculated directly into the intake manifold 16. In other embodiments, the third flow path 42 may direct the third portion of exhaust gases at any location in the intake channel 29 for mixing with the compressed air 28 prior to entering the intake manifold 16.

The turbocharged unit 10 also includes a control unit 48. In the illustrated embodiment, the control unit 48 is an electronic control unit for the turbocharger 12 and the engine 14. In another embodiment, the control unit 48 is an electronic logic control unit that is programmable by a user.

The control unit 48 is configured to sense multiple operating parameters via multiple sensors located in system 10. In one embodiment, the control unit 48 receives a pressure signal from a pressure sensor provided to detect pressure of intake air 28 fed to the engine 14. Additionally, the control unit 48 receives a temperature signal from a temperature sensor provided to detect temperature of intake air 28 fed to the engine 14. The control unit 48 may also receive an oxygen signal from an oxygen sensor provided to detect quantity of oxygen in the intake air 28 fed to the intake manifold 16. In some embodiments, the control unit 48 may also receive another oxygen signal from another oxygen sensor provided to detect quantity of oxygen from the exhaust gas fed from the exhaust manifold 18. Further, the control unit 48 may also receive a mass flow signal from a fuel sensor provided to detect mass flow of a fuel fed to the engine 14. The control unit 48 may also receive a speed signal from a speed sensor, a load signal from a load sensor, a fuel injection timing signal from an injection timing sensor, and an exhaust gas recirculation mass flow signal from a mass flow sensor.

Further, the control unit 48 controls the engine speed and/or fuel mass flow by producing a timing signal to control operation of the fuel injectors in the fuel injection system 19. The control unit 48 is also configured to increase a flow rate of the exhaust gas recirculation in the third flow path 42 by controlling the EGR valve 44 and further increase injection pressure, and advance a fuel injection timing based on the signals received from the multiple sensors for reducing nitrogen oxide (NOx) and particulate matter (PM) emission levels that meets emissions regulation.

In order to meet the emissions requirements, the control unit 48 is configured for varying the exhaust gas recirculation flow rate, the fuel injection pressure and/or duration and the fuel injection timing while optimizing the speed of operation of the engine 14 at each engine power setting.

The optimizing of the engine speed at each engine power setting includes reducing a normal engine speed at the corresponding engine power setting while maintaining constant engine power level by increasing the fuel injection per cycle for increasing engine torque such that power is maintained at the same level. In one embodiment, an injection pressure may also be increased for increasing fuel injection per cycle to increase the engine torque. The reduction of the normal engine speed at each engine power setting is based on meeting a threshold limit of multiple operating parameters including peak cylinder pressures and engine shaft bearing loads. Further, the reduction of the normal engine speed at each engine power setting is based on an air-handling system requirement of an oxygen-to-fuel ratio (OFR) of at least a value greater than the threshold at the respective engine power. The oxygen-to-fuel ratio (OFR) is defined as the ratio of a total intake of oxygen mass flow to a fuel mass flow. It is to be noted that speed reduction may be higher at lower engine power settings (lower notches) for reducing particulate matter emissions.

In one embodiment, the control unit 48 is configured to increase a boost pressure for maintaining the oxygen-to-fuel ratio above a threshold value at each engine power setting. For increasing the boost pressure of the turbocharger unit 12, the control unit 48 controls a variable valve position of the bypass control valve 40 in the exhaust channel 38 bypassing the first stage turbine 24 in accordance with an embodiment of the present invention. In another embodiments, the control unit 48 may be configured to control a variable geometry turbocharger (VGT), or a supercharger, or a subsystem of multiple compressors arranged for increasing the boost pressure and thereby maintaining the oxygen-to-fuel ratio (OFR) of at least a specific threshold value at each engine power.

Also the optimizing of the flow rate of the recirculating exhaust gases includes increasing the exhaust gas recirculation flow rate and advancing the fuel injection timing while concurrently reducing the speed of operation of the engine 14 for reducing the nitrogen oxide (NOx) and particulate matter (PM) emission levels of the exhaust gases of the engine 14. In a non-limiting example, the flow rate of the exhaust gas recirculation is increased by about 40 percent while advancing the fuel injection timing accordingly. In one embodiment, a compression ratio of the engine 14 is lowered for reducing emission levels for meeting emissions regulation.

In one embodiment, the control unit 48 is configured to reduce the engine speed in real time in response to maximum emission levels of the nitrogen oxide (NOx) and the particulate matter (PM) in the exhaust gases. The nitrogen oxide (NOx) level is detected by a nitrogen oxide (NOx) sensor in the exhaust gases or as a function of operating manifold air temperature, injection timing and the like, whereas the particulate matter (PM) level is detected by inference from sensing of oxygen-to-fuel ratio in the intake manifold 16 and the exhaust manifold 18.

Further, in one embodiment, the nitrogen oxide (NOx) emission is reduced by operating the engine 14 in accordance with a Miller cycle that involves moving a piston from a top dead center position towards a bottom dead center position in the engine cylinder, closing an intake valve of the internal combustion engine when the piston is about the bottom dead center position in the engine cylinder during intake stroke and opening an exhaust valve for a predetermined time period when the piston is about the bottom dead center position of the engine cylinder after closing the intake valve during exhaust stroke so as to exhaust a predetermined quantity of fresh charge from the engine cylinder via the exhaust valve. The Miller cycle is aimed at reducing an effective compression ratio while maintaining an expansion ratio. This lowers an in-cylinder adiabatic compression temperature, which enables a reduction in nitrogen oxide (NOx) emissions.

Figure 2:
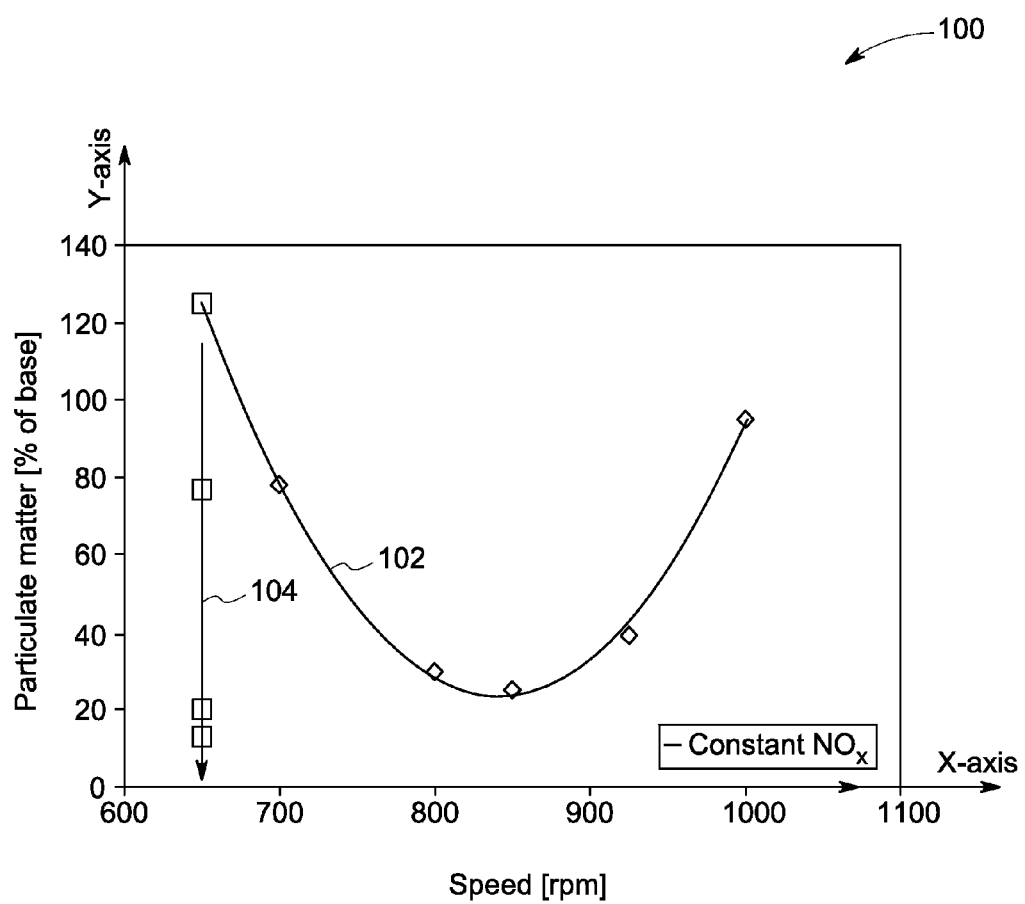
FIG. 2 shows a plot comparing particulate matter emissions of exhaust gases at a constant exhaust recirculation flow rate as a function of engine speed and a comparison of particulate matter emissions at increasing flow rate of recirculating exhaust gases at constant speed at constant NOx in accordance with an embodiment of the present invention.

FIG. 2 shows a plot 100 comparing particulate matter emissions of exhaust gases at a constant exhaust gas recirculation flow rate and at an increasing flow rate of recirculating exhaust gases in accordance with an embodiment of the present invention. The y-axis of the plot 100 shows a particulate matter (PM) emission level in percent of base PM emissions. The x-axis of the plot 100 shows speed of operation of the engine in revolutions per minute (rpm). The plot 100 shows a first curve 102 depicting particulate matter (PM) levels in exhaust gases at constant flow rate of recirculating exhaust gases at various speed of the engine while a second curve 104 depicts particulate matter (PM) levels in exhaust gases while increasing flow rate of recirculating exhaust gases at constant speed of the engine. The plot 100 clearly illustrates significant reduction of particulate matter (PM) in exhaust gases when reducing the engine speed and concurrently increasing the exhaust gas recirculation.

Figure 3:
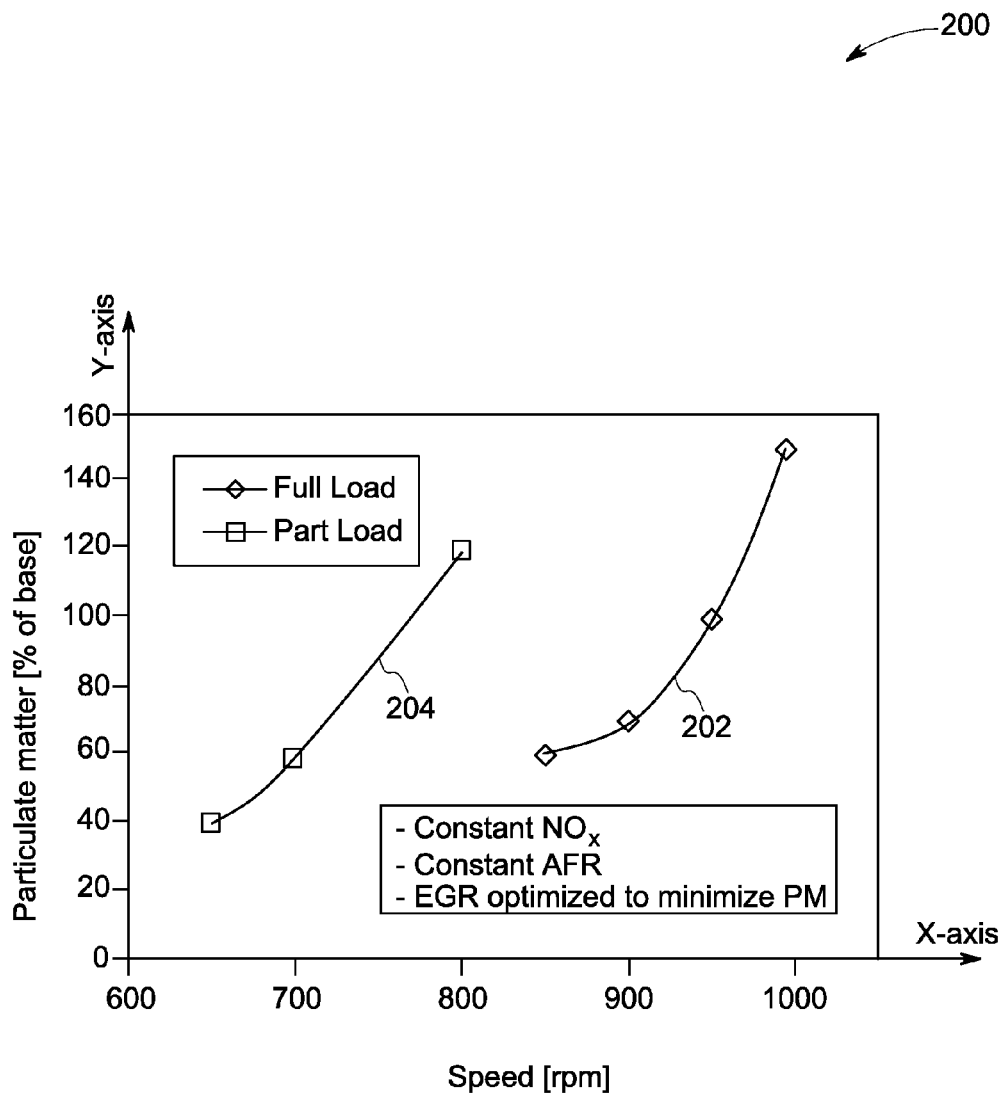
FIG. 3 shows a plot comparing particulate matter emission levels of exhaust gases at different engine power at constant NOx in accordance with an embodiment of the present invention.

By way of a non-limiting example, FIG. 3 shows a plot 200 comparing particulate matter emission levels of exhaust gases at different engine power settings in accordance with an embodiment of the present invention. The y-axis of the plot 200 shows a particulate matter (PM) emission level as percent of baseline emissions. The x-axis of the plot 200 shows speed of operation of the engine in revolutions per minute (rpm). It is to be noted that in the chart 200 particulate matter emission levels of exhaust gases are depicted at different engine speed at part load and full load conditions while keeping the nitrogen oxide (NOx) emission level and air to fuel ratio constant. In this non-limiting example, the exhaust gas recirculation was optimized to minimize the particulate matter emission. The plot 200 shows a first curve 202 depicting particulate matter (PM) levels in exhaust gases at full load conditions. The plot 200 shows a second curve 204 depicting particulate matter (PM) levels in exhaust gases at part load conditions. The plot 200 clearly illustrates reduction of particulate matter (PM) in exhaust gases at lower speeds.

Figure 4:
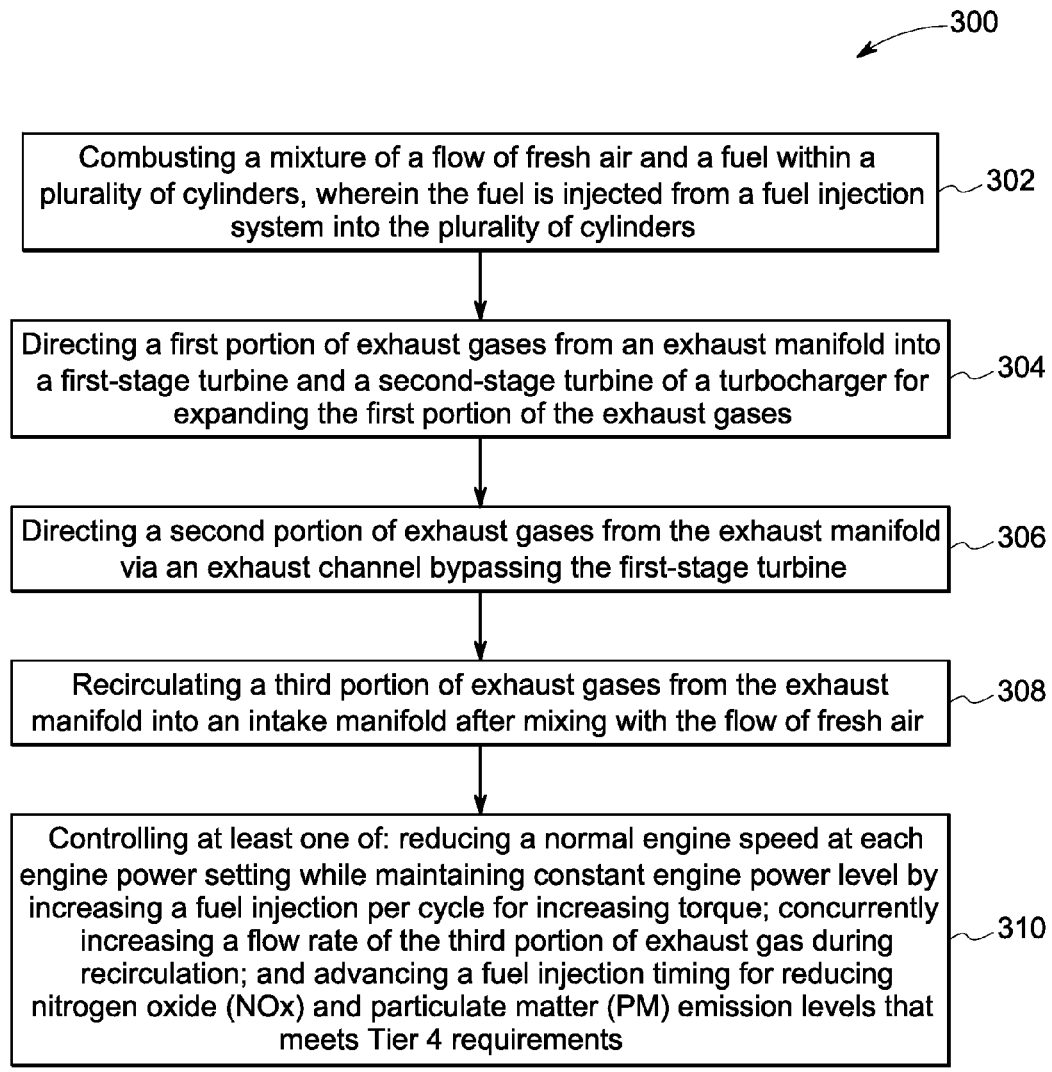
FIG. 4 is flow chart of a method of operating an internal combustion engine in accordance with an embodiment of the present invention.

FIG. 4 is flow chart 300 of a method of operating an internal combustion engine in accordance with an embodiment of the present invention. At step 302, the method includes combusting a mixture of a flow of fresh air and a fuel within a plurality of cylinders, wherein the fuel is injected from a fuel injection system into the plurality of cylinders. At step 304, the method includes directing a first portion of exhaust gases from an exhaust manifold into a first-stage turbine and a second-stage turbine of a turbocharger for expanding the first portion of the exhaust gases. Further at step 306, the method further includes directing a second portion of exhaust gases from the exhaust manifold via an exhaust channel bypassing the first-stage turbine. Furthermore, at step 308, the method includes recirculating a third portion of exhaust gases from the exhaust manifold into an intake manifold after mixing with the flow of fresh air. Finally at step 310, the method includes controlling at least one of: reducing a normal engine speed at each engine power setting while maintaining constant engine power level by increasing a fuel injection per cycle for increasing torque; concurrently increasing a flow rate of the third portion of exhaust gas during recirculation; and advancing a fuel injection timing for reducing nitrogen oxide (NOx) and particulate matter (PM) emission levels that meets emissions regulation.

It is to be noted that the reduction of speed at each engine power setting is subjected to meeting a mechanical limitation including a maximum peak cylinder pressure and a maximum bearing load. Both the peak cylinder pressure and the bearing loads increase as the fueling per cycle is increased. Further, the reduction of speed at each engine power setting is subjected to meeting the air-handling limitations of the oxygen-to-fuel ratio (OFR) of at least a threshold value at each power setting to maintain low particulate matter (PM) emissions. There may be different threshold oxygen-to-fuel ratio (OFR) at each engine power setting (notch). It is also to be noted that the turbocharger unit 12 (shown in FIG. 1) limits the ability to meet the oxygen-to-fuel ratio (OFR) constraint. If the exhaust gas recirculation (EGR) level is increased too much while maintaining OFR above a minimum level, the engine speed can only be reduced so much before hitting a limitation of the air handling system.

The method also includes increasing an injection pressure and/or duration at each engine power setting while reducing the normal engine speed for maintaining constant engine power level. In one embodiment, the method includes concurrently reducing the engine speed, increasing the exhaust gas recirculation, advancing the fuel injection timing, increasing an injection pressure and lowering a compression ratio to achieve desired nitrogen oxide (NOx) and particulate matter (PM) emission levels in the exhaust gases of the engine. Advantageously, the present system and method is directed towards controlling exhaust emissions that meets the regulated requirements (Tier IV) without using any aftertreatment system.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating an internal combustion engine, the method comprising:

combusting a mixture of a flow of fresh air and a fuel within a plurality of cylinders, wherein the fuel is injected from a fuel injection system into the plurality of cylinders;
   directing a first portion of exhaust gases from an exhaust manifold into a first-stage turbine and a second-stage turbine of a turbocharger for expanding the first portion of the exhaust gases;
   recirculating a second portion of exhaust gases from the exhaust manifold into an intake manifold after mixing with the flow of fresh air; and
   reducing nitrogen oxide (NOx) and particulate matter (PM) emission levels by
      reducing the engine speed while operating the internal combustion engine at a given engine power while further maintaining the given engine power constant by increasing a fuel injection duration per cycle for increasing torque; and
      concurrently increasing a flow rate of the second portion of exhaust gas during recirculation;
      advancing a fuel injection timing.

2. The method of claim 1, further comprising increasing an injection pressure at a given engine power while reducing the engine speed at each engine power setting for maintaining constant engine power level.

3. The method of claim 1, further comprising reducing the engine speed at the given engine power based on not exceeding a threshold limit of a plurality of operating parameters comprising peak cylinder pressures and engine shaft bearing loads.

4. The method of claim 1, further comprising reducing the engine speed at a given engine power based on an air-handling system requirement of an oxygen-to-fuel ratio of at least a threshold value for respective engine power.

5. The method of claim 4, further comprising increasing a boost pressure for maintaining the oxygen-to-fuel ratio of at least a threshold value at each engine power setting by controlling at least one of a variable valve position in the exhaust channel bypassing the first stage turbine, a variable geometry turbocharger, a supercharger, and a subsystem of a plurality of compressors arranged for increasing the boost pressure.

6. The method of claim 1, wherein the flow rate of the exhaust gas recirculation is increased by about 40 percent while advancing the fuel injection timing.

7. The method of claim 1, further comprising concurrently reducing the engine speed, increasing the exhaust gas recirculation, advancing the fuel injection timing, increasing an injection pressure and lowering a compression ratio in response to both the nitrogen oxide (NOx) and particulate matter (PM) emission levels of the exhaust gases of the engine.

8. The method of claim 7, further comprising lowering the compression ratio in each cylinder from about 17.1 to about 15.1.

9. The method of claim 1, further comprising reducing the engine speed in real time in response to a maximum emission levels of nitrogen oxide (NOx) detected by a sensing system in exhaust gases and particulate matter (PM) inferred from the sensing of oxygen-to-fuel ratio in the intake manifold.

10. The method of claim 1, further comprising cooling the second portion of exhaust gases prior to entering the intake manifold by an exhaust gas recirculation cooler.

11. The method of claim 1, further comprising cooling the fresh air using one or more heat exchangers in an intake channel having a first stage compressor and a second-stage compressor.

12. The method of claim 1, wherein the operating of the internal combustion engine in accordance with a Miller cycle comprises:
moving a piston from a top dead center position towards a bottom dead center position in an engine cylinder;
closing an intake valve of the internal combustion engine when the piston is about the bottom dead center position in the engine cylinder during an intake stroke;
opening an exhaust valve for a predetermined time period when the piston is about the bottom dead center position of the engine cylinder after closing the intake valve during an exhaust stroke so as to exhaust a predetermined quantity of fresh charge from the engine cylinder via the exhaust valve.

13. A system comprising:
an internal combustion engine comprising a plurality of cylinders of the engine for combusting a mixture of fresh air and fuel;
a fuel injection system for injecting fuel into the plurality of cylinders of the engine;
a turbocharger unit including a turbine coupled via a turbocharger shaft to a compressor, wherein the compressor is configured to receive the fresh air and discharge a compressed air stream to an intake manifold of the internal combustion engine;
a first flow path for allowing a first portion of exhaust gases from an exhaust manifold into the turbine for expanding the first portion of the exhaust gases;
a second flow path for allowing a second portion of exhaust gases from the exhaust manifold via an exhaust channel bypassing a first-stage turbine;
a third flow path for recirculating a third portion of exhaust gases from the exhaust manifold into the intake manifold after mixing with the fresh air; and
a controller comprising a plurality of sensors for sensing a plurality of operating parameters, wherein the controller is configured to reduce nitrogen oxide (NOx) and particulate matter (PM) emission levels by a) reducing the engine speed at a given engine power while maintaining the given engine power constant by increasing a fuel injection duration per cycle for increasing torque, b) increasing a flow rate of the exhaust gas recirculation, c) increasing injection pressure, and d) advancing a fuel injection timing.

14. The system of claim 13, wherein the controller is further configured to lower the compression ratio in each cylinder from about 17.1 to about 15.1.

15. The system of claim 13, further comprising an exhaust gas recirculation cooler located in the third flow path carrying the third portion of exhaust gases into the intake manifold and one or more intercoolers located in an intake channel having a first stage compressor and a second stage compressor.

16. The system of claim 14, wherein the third flow path comprises an EGR control valve for controlling the flow of the second portion of the exhaust gases.

17. The system of claim 13, wherein the controller is configured to concurrently increase the exhaust gas recirculation (EGR) and advance the fuel injection timings in response to both the nitrogen oxide (NOx) and particulate matter (PM) emission levels of the exhaust gases of the engine.

18. The system of claim 13, wherein the controller is configured to concurrently reduce the engine speed at each engine power setting based on a plurality of operating parameters comprising peak cylinder pressures and engine shaft bearing loads, an air-handling system requirement of an oxygen-to-fuel ratio of at least a threshold value at the respective engine power setting, and increase the exhaust gas recirculation and advance the fuel injection timing in response to both the nitrogen oxide (NOx) and particulate matter (PM) emission levels of the exhaust gases of the engine.

19. A controller for an internal combustion engine, comprising:
a plurality of sensors for sensing a plurality of operating parameters of the engine;
a control unit configured to reduce nitrogen oxide (NOx) and particulate matter (PM) emission levels of the engine at each engine power setting
by a) concurrently reducing the engine speed at corresponding engine power setting while maintaining the engine power constant by increasing a fuel injection duration per cycle for increasing torque, b) increasing the exhaust gas recirculation and c) advancing the fuel injection timing.

* * * * *